(12) United States Patent
Lee et al.

(10) Patent No.: US 12,039,813 B2
(45) Date of Patent: Jul. 16, 2024

(54) APPARATUS AND METHOD FOR REGISTRATION AND AUTHENTICATION OF USER EQUIPMENT FOR CONTROLLING VEHICLE

(71) Applicant: SAMBO MOTORS CO., LTD., Daegu (KR)

(72) Inventors: Yong Hee Lee, Gyeonggi-do (KR); Tae Ho Kim, Gyeonggi-do (KR); Tae In Seo, Gyeonggi-do (KR); Se Hoon Oh, Seoul (KR)

(73) Assignee: SAMBO MOTORS CO., LTD., Daegu (KR)

( * ) Notice: Subject to any disclaimer, the term of this patent is extended or adjusted under 35 U.S.C. 154(b) by 112 days.

(21) Appl. No.: 17/899,084

(22) Filed: Aug. 30, 2022

(65) Prior Publication Data
US 2023/0067674 A1    Mar. 2, 2023

(30) Foreign Application Priority Data

Aug. 30, 2021  (KR) ......................... 10-2021-0114700

(51) Int. Cl.
*G07C 9/00* (2020.01)
*H04W 12/06* (2021.01)
*H04W 12/63* (2021.01)

(52) U.S. Cl.
CPC ........ *G07C 9/00309* (2013.01); *H04W 12/06* (2013.01); *G07C 2009/005* (2013.01); *G07C 2009/00984* (2013.01); *G07C 2209/02* (2013.01); *G07C 2209/04* (2013.01); *G07C 2209/63* (2013.01); *G07C 2209/64* (2013.01); *H04W 12/63* (2021.01)

(58) Field of Classification Search
None
See application file for complete search history.

(56) References Cited

U.S. PATENT DOCUMENTS

| | | | |
|---|---|---|---|
| 10,525,933 B2* | 1/2020 | Hwang | H04W 4/025 |
| 11,228,913 B2* | 1/2022 | Jimenez | H04L 63/0853 |
| 2017/0048224 A1* | 2/2017 | Teraoka | H04W 12/06 |
| 2019/0077368 A1* | 3/2019 | Hwang | B60R 25/24 |

FOREIGN PATENT DOCUMENTS

| | | |
|---|---|---|
| JP | 2020-076242 A | 5/2020 |
| KR | 10-1973589 B1 | 8/2019 |
| KR | 10-2021-0055556 A | 5/2021 |
| KR | 10-2251593 B1 | 5/2021 |

* cited by examiner

*Primary Examiner* — Carlos Garcia
(74) *Attorney, Agent, or Firm* — Sughrue Mion, PLLC

(57) ABSTRACT

A device for registering and authenticating a user device for vehicle control includes: a communication unit connected to the user device to receive an authentication request from the user device; an interface configured to communicatively connect with at least one antenna included in the vehicle and communicating with a FOB of the vehicle; and a processor configured to detect whether the user device is registered based on at least one of user information and device information included in the received authentication request, to detect whether a user of the user device has the FOB by using the at least one antenna, and to control a registration process of the user device which is set differently depending on whether the user has the FOB when the user device is not registered.

15 Claims, 10 Drawing Sheets

APPARATUS AND METHOD FOR REGISTRATION AND AUTHENTICATION OF USER EQUIPMENT FOR CONTROLLING VEHICLE

CROSS REFERENCE TO RELATED APPLICATION

This application claims the benefit of Korean Patent Application No. 10-2021-0114700, filed Aug. 30, 2021, which is hereby incorporated by reference in its entirety into this application.

BACKGROUND

1. Field

The disclosure relates to an apparatus and a method of registering and authenticating a user device mounted in a vehicle to control the vehicle.

2. Description of the Related Art

A smart key of a vehicle is an apparatus that enables a user to open and close the door and start the vehicle without the user inserting a separate key or manipulating an operation button. In recent years, with the development of Internet of Things (IoT) technology, communication and electronic control technologies applied to vehicles are also rapidly developing.

In particular, in recently released vehicles, various functions are provided through communication between a user device and a vehicle, such as opening and closing a door or starting the vehicle using a user device such as a smart key or a smart phone possessed by a user. For example, the user device may be connected to the vehicle through a short-range wireless communication method such as Bluetooth or a wireless communication method such as LTE, 5G, and Wi-Fi.

On the other hand, in the case of a vehicle used by family, a business vehicle, or a shared vehicle, it may be inconvenient for a large number of users to use the vehicle with a limited number of smart keys, so the demand for a function of using a vehicle through the user device described above may be high.

SUMMARY

Provided are apparatuses capable of performing registration and authentication procedures for controlling a vehicle through user devices such as a smart phone without communication with a server.

Provided are registration and authentication apparatuses capable of registering user devices by varying control authority for a vehicle.

According to an aspect of an embodiment, a device for registering and authenticating a user device for vehicle control includes: a communication unit connected to the user device to receive an authentication request from the user device; an interface configured to communicatively connect with at least one antenna included in the vehicle and communicating with a FOB of the vehicle; and a processor configured to detect whether the user device is registered based on at least one of user information and device information included in the received authentication request, to detect whether a user of the user device has the FOB by using the at least one antenna, and to control a registration process of the user device which is set differently depending on whether the user has the FOB when the user device is not registered.

According to an exemplary embodiment, the processor registers the user device as a master device, a general device, or a temporary device according to the registration process, and control authority of the master device is greater than control authority of the general device and the temporary device.

According to an exemplary embodiment, the processor controls a registration process for registering the user device as a master device when it is detected that the user has the FOB and there is no other device previously registered as a master device.

According to an exemplary embodiment, the processor is configured to: generate random data for authentication of the user device; transmit the generated random data according to random data destination information included in the authentication request; when random data is input through the user device in response to the transmission of the random data, receive the input random data from the user device; and, when the received random data and the generated random data match each other, register the user device as the master device, and store at least a portion of the user information and the device information included in the authentication request in a memory.

According to an exemplary embodiment, the processor controls a registration process for registering the user device as a general device or a temporary device when it is detected that the user does not have the FOB and there is another device registered as a master device.

According to an exemplary embodiment, the processor is configured to: generate random data for authentication of the user device; transmit the generated random data according to random data destination information of another device registered as the master device; when random data is input through the user device in response to the transmission of the random data, receive the input random data from the user device; and, when the received random data and the generated random data match each other, register the user device as the general device or the temporary device, and store at least a portion of the user information and the device information included in the authentication request in a memory.

According to an exemplary embodiment, the generated random data comprises first random data corresponding to registration as a general device and second random data corresponding to registration as a temporary device, and the processor is configured to: register the user device as a general device when the received random data matches the first random data; and register the user device as a temporary device when the received random data matches the second random data.

According to an exemplary embodiment, the processor controls a registration process for registering the user device as a master device, a general device, or a temporary device when it is detected that the user has the FOB and there is another device registered as a master device.

According to an exemplary embodiment, the processor is configured to: generate random data for authentication of the user device; transmit the generated random data according to random data destination information of another device registered as the master device; when random data is input through the user device in response to the transmission of the random data, receive the input random data from the user device; and register the user device as a master device, a general device, or a temporary device based on the received random data, and store at least a portion of the user information and the device information included in the authentication request in a memory.

According to an exemplary embodiment, the generated random data comprises first random data corresponding to registration as a general device, second random data corresponding to registration as a temporary device, and third random data corresponding to registration as a master device, and the processor is configured to: register the user device as a general device when the received random data matches the first random data; register the user device as a temporary device when the received random data matches the second random data; and register the user device as a master device when the received random data matches the third random data, and cancel registration of another device previously registered as a master device.

According to an exemplary embodiment, the processor is configured to: estimate a distance between the vehicle and the user device using the communication unit or a relative location of the user device with respect to the vehicle; estimate, by using the at least one antenna, a distance between the vehicle and the FOB or a relative location of the FOB with respect to the vehicle; and check that the user has the FOB when a difference between the estimated distances or the relative locations is less than a preset threshold.

According to an aspect of an embodiment, a method of registering and authenticating a user device for controlling a vehicle comprising: receiving, by a device registration and authentication apparatus included in the vehicle, an authentication request from the user device; checking, by the device registration and authentication apparatus, whether the user device is registered in response to the received authentication request, and detecting whether a user of the user device has a FOB of the vehicle; and performing a registration process of the user device which is set differently depending on whether the user has the FOB when the user device is not registered.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
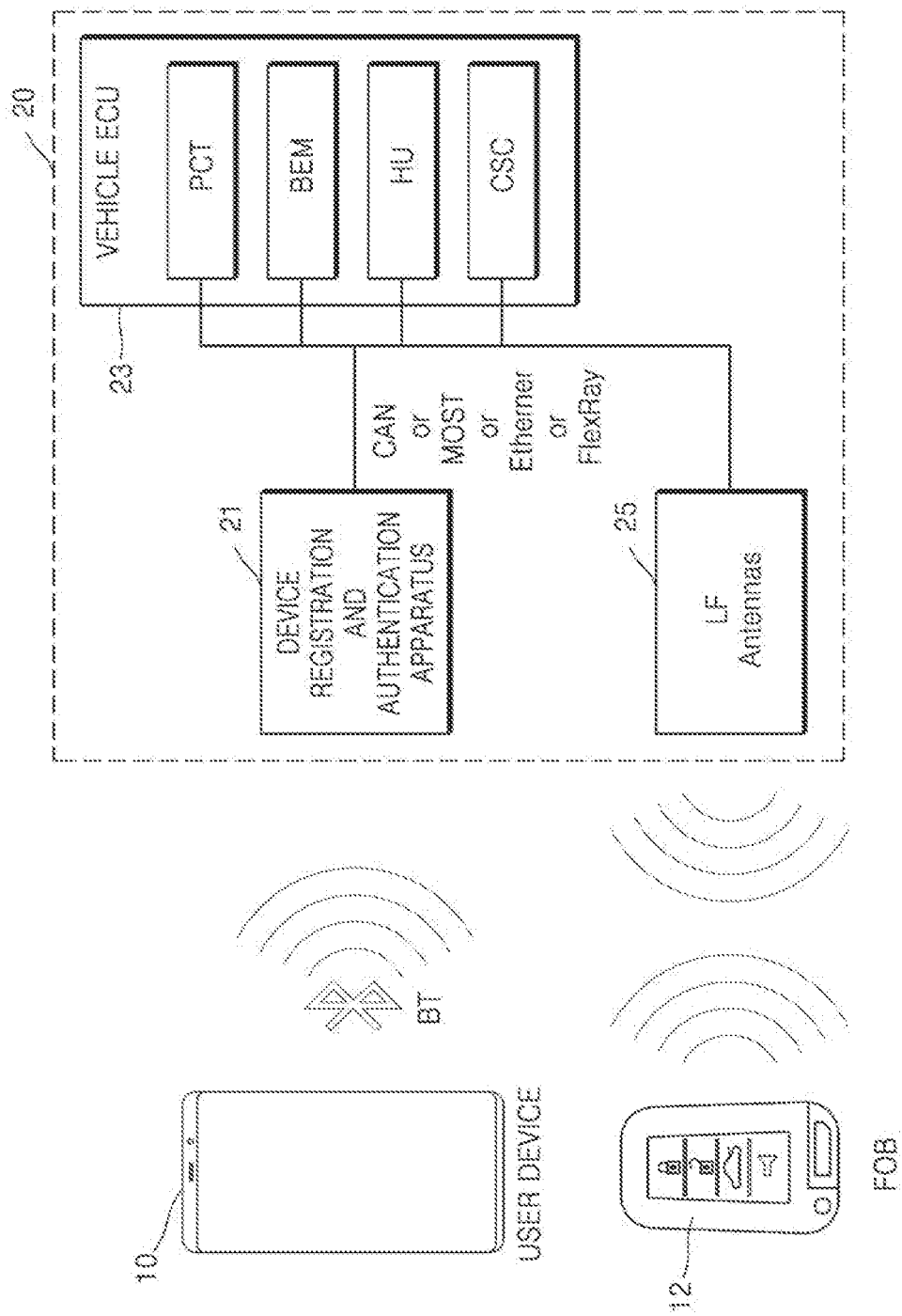
FIG. 1 is a network configuration diagram according to an embodiment.

Embodiments according to the inventive concept are provided to more completely explain the inventive concept to one of ordinary skill in the art, and the following embodiments may be modified in various other forms and the scope of the inventive concept is not limited to the following embodiments. Rather, these embodiments are provided so that the disclosure will be thorough and complete, and will fully convey the scope of the inventive concept to one of ordinary skill in the art.

It will be understood that, although the terms first, second, etc. may be used herein to describe various members, regions, layers, sections, and/or components, these members, regions, layers, sections, and/or components should not be limited by these terms. These terms do not denote any order, quantity, or importance, but rather are only used to distinguish one component, region, layer, and/or section from another component, region, layer, and/or section. Thus, a first member, component, region, layer, or section discussed below could be termed a second member, component, region, layer, or section without departing from the teachings of embodiments. For example, as long as within the scope of this disclosure, a first component may be named as a second component, and a second component may be named as a first component.

Unless otherwise defined, all terms (including technical and scientific terms) used herein have the same meaning as commonly understood by one of ordinary skill in the art to which the inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

When a certain embodiment may be implemented differently, a specific process order may be performed differently from the described order. For example, two consecutively described processes may be performed substantially at the same time or performed in an order opposite to the described order.

In addition, terms including "unit," "er," "or," "module," and the like disclosed in the specification mean a unit that processes at least one function or operation and this may be implemented by hardware or software such as a processor, a micro processor, a micro controller, a central processing unit (CPU), a graphics processing unit (GPU), an accelerated Processing unit (APU), a digital signal processor (DSP), an application specific integrated circuit (ASIC), and a field programmable gate array (FPGA) or a combination of hardware and software. Furthermore, the terms may be implemented in a form coupled to a memory that stores data necessary for processing at least one function or operation.

In addition, it is intended to clarify that the division of the components in the specification is only made for each main function that each component is responsible for. That is, two or more components to be described later below may be combined into one component, or one components may be divided into two or more components according to more subdivided functions. In addition, it goes without saying that each of the components to be described later below may additionally perform some or all of the functions of other components in addition to its own main function, and some of the main functions that each of the components is responsible for may be dedicated and performed by other components.

As used herein, the term "and/or" includes any and all combinations of one or more of the associated listed items.

Hereinafter, embodiments of the inventive concept will be described in detail with reference to the accompanying drawings.

FIG. 1 is a network configuration diagram according to an embodiment.

Referring to FIG. 1, the entire network may include a user device 10 and a vehicle 20.

The vehicle 20 may include a device registration and authentication apparatus 21 and a vehicle electronic control unit (ECU) 23. The vehicle 20 may include a smart key such as a FOB 12, and in this case, may further include a plurality of antennas 25 (e.g., low frequency (LF) antennas, etc.) for performing communication with the FOB 12.

The FOB 12 may correspond to a portable device that a user of the vehicle 20 may carry. The plurality of antennas 25 may include a plurality of indoor antennas for detecting whether the FOB 12 is located within the vehicle, and a plurality of outdoor antennas for detecting whether the FOB 12 approaches the vehicle within a certain distance and/or the distance or location of the FOB 12. However, the type or number of antennas may vary according to a communication method between the vehicle 20 and the FOB 12.

The user device 10 may perform wireless communication with the device registration and authentication apparatus 21 of the vehicle 20. For example, the user device 10 may communicate with the vehicle 20 according to a short-range wireless communication method, and the short-range wireless communication may include Bluetooth communication, but this is only an embodiment. Various short-range wireless communication methods such as Wi-Fi communication, Near Field Communication (NFC), Radio Frequency Identification (RFID), and Ultra Wideband (UWB) communication may be used. However, communication between the user device 10 and the device registration and authentication apparatus 21 is not performed only by short-range wireless communication. According to an embodiment, the user device 10 may communicate with the device registration and authentication apparatus 21 according to various wireless communication methods such as Wi-Fi, long-term evolution (LTE), and 5G.

The user device 10 and the vehicle ECU 23 may transmit and receive information or commands for controlling the vehicle 20 through the user device 10, and state information of the vehicle 20. Prior to this, the user device 10 may register the user device 10 as a controllable device of the vehicle 20 through communication with the device registration and authentication apparatus 21, and may perform an authentication procedure when using the vehicle 20. For example, controllable items when registering the user device 10 may include opening/closing of a door or window, air conditioning control, ignition on/off, and the like.

The user device 10 may include a portable device such as a smart phone, a tablet PC, or a wearable device, and according to an embodiment, may include a device without a display or an input unit, such as an RFID tag or an NFC tag. According to an embodiment, a vehicle control APP 152 (of FIG. 2) may be installed in the user device 10 for device registration and authentication through communication with the vehicle 20, or for executing a vehicle control function.

The device registration and authentication apparatus 21 may control all operations related to registration and authentication of the user device 10 described above. The device registration and authentication apparatus 21 may be implemented as a device mounted in the vehicle 20, and may be provided integrally with the vehicle ECU 23 according to an embodiment. In particular, the device registration and authentication apparatus 21 may be implemented to be able to control all registration and authentication procedures of the user device 10 without being connected to a separate server. Various embodiments related to a registration and authentication procedure of the user device 10 using the device registration and authentication apparatus 21 will be described later with reference to FIGS. 3 to 10.

When the device registration and authentication apparatus 21 is provided as a device in a form separate from the vehicle ECU 23, the device registration and authentication apparatus 21 may exchange information with the vehicle ECU 23 using at least one of controller area network (CAN) communication, media oriented systems transport (MOST) communication, Ethernet communication, and FlexRay communication. The information may include, but is not limited to, various control signals and sensing signals. According to an embodiment, a vehicle gateway (not shown) may be provided between the device registration and authentication apparatus 21 and the vehicle ECU 23. In this case, the device registration and authentication apparatus 21 may be connected to the vehicle gateway through the CAN communication or the like, and may exchange information with the vehicle ECU 23 through the vehicle gateway.

The vehicle ECU 23 may control the operation of most components of the vehicle 20. For example, the vehicle ECU 23 may include a powertrain controller (PTC) domain, a body electronic module (BEM) domain, a head unit (HU) domain, and a chassis and safety controller (CSC) domain.

According to an embodiment, the PTC domain may include an engine controller, a powertrain sensor, a hybrid controller, and the like.

According to an embodiment, the BEM domain may include a door controller, an air conditioning controller, a seat controller, a trunk controller, a window/mirror controller, a lamp controller, and the like.

According to an embodiment, the HU domain may include controllers that provide functions such as navigation, multimedia (audio/video, etc.), telematics, and the like.

According to an embodiment, the CSC domain may include a brake controller, a steering controller, an environmental sensor, an airbag controller, a cruise controller, a tire pressure controller, and the like.

According to the present embodiment, when the authentication of the user device 10 is successful by the device registration and authentication apparatus 21, the vehicle ECU 23 may receive a control signal for controlling the vehicle 20 from the user device 10, and may perform a control operation for executing a certain function of the vehicle 20 based on the received control signal.

Figure 2:
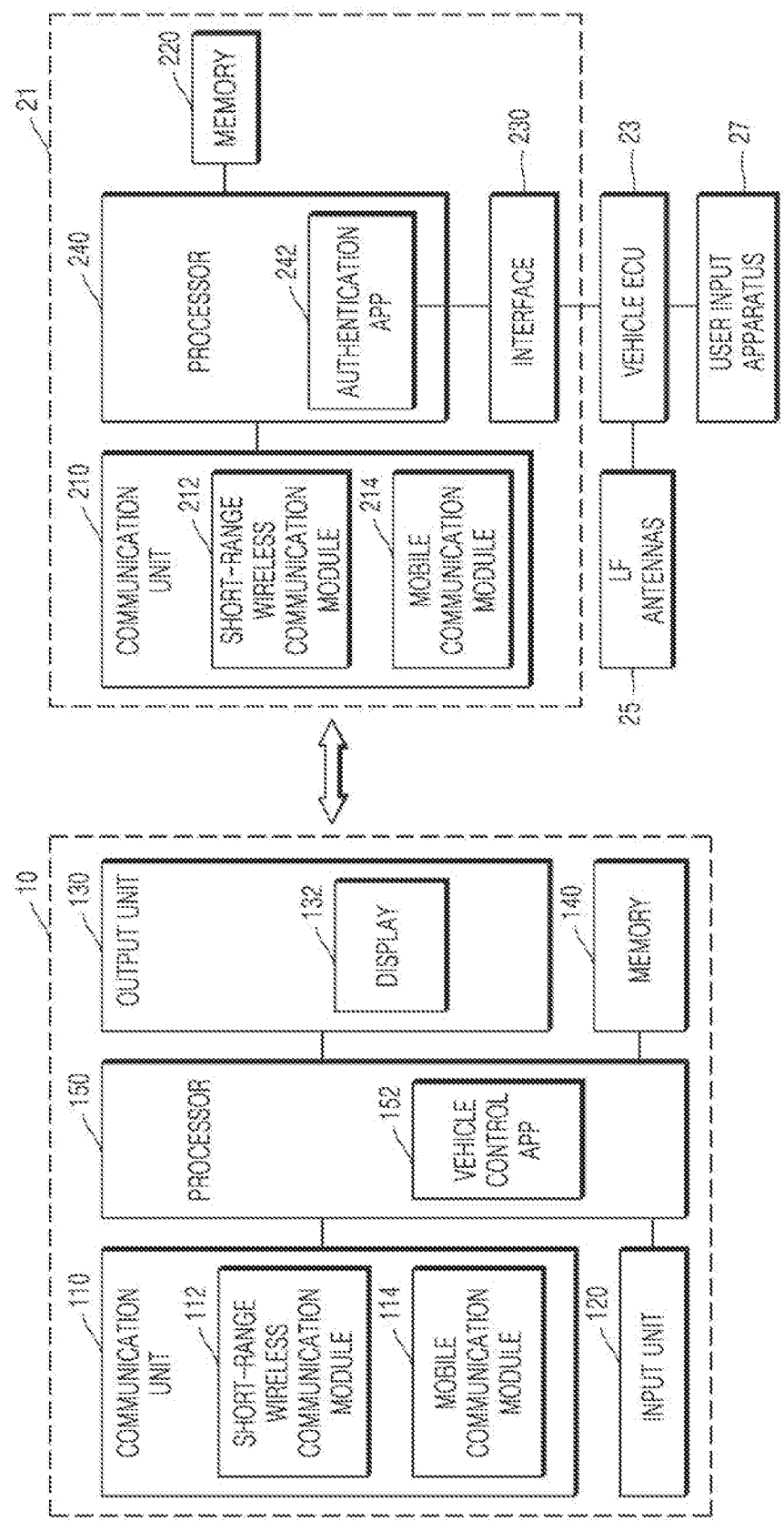
FIG. 2 is a block diagram illustrating a detailed configuration of a user device and a device registration and authentication apparatus, according to an embodiment.

FIG. 2 is a block diagram illustrating a detailed configuration of the user device 10 and the device registration and authentication apparatus 21, according to an embodiment.

Referring to FIG. 2, the user device 10 may include a communication unit 110, an input unit 120, an output unit 130, a memory 140, and a processor 150. The device registration and authentication apparatus 21 may include a communication unit 210, a memory 220, an interface 230, and a processor 240. The configuration of the user device 10 and the device registration and authentication apparatus 21 shown in FIG. 2 is an embodiment for convenience of description, and each of the user device 10 and the device registration and authentication apparatus 21 may include more or fewer configurations than those shown in FIG. 2.

The communication unit 110 of the user device 10 may include a short-range wireless communication module 112 for communicating with devices such as the device registration and authentication apparatus 21 located in a short distance within a certain distance, and a mobile communication module 114 for communicating with the device registration and authentication apparatus 21, another device, and/or a server through a mobile communication network. The short-range wireless communication module 112 may include at least one communication interface supporting a known short-range wireless communication method such as Bluetooth, NFC, or UWB. The mobile communication module 114 may include at least one communication interface supporting known mobile communication methods such as LTE, LTE-Advanced (LTE-A), and 5G.

The input unit 120 may receive various types of inputs from a user for executing a function of the user device 10 or inputting information. For example, the input unit 120 may include various types of known input devices such as a microphone, a camera, a button, a dial, a touch panel, and/or a touch screen.

The output unit 130 may output various information or data processed through the user device 10. For example, the output unit 130 may include a display 132 that outputs the information or data in a text or graphic form, but is not limited thereto, and may include various output devices such as a speaker and a haptic module.

The memory 140 may store information related to the operation of the user device 10, program data, algorithms, and the like. According to an embodiment, the memory 140 may store data of an application (the vehicle control APP 152) for registration and authentication of the user device 10, and control of a vehicle. The memory 140 may include a volatile memory and a non-volatile memory.

The processor 150 may control all operations of components included in the user device 10. According to an embodiment, when the vehicle control APP 152 is executed, the processor 150 may control the device registration and authentication operation between the user device 10 and the device registration and authentication apparatus 21 through the vehicle control APP 152, and may transmit a vehicle control command through the vehicle control APP 152 to the vehicle 20.

The communication unit 210 of the device registration and authentication apparatus 21 may include a short-range wireless communication module 212 for communicating with devices such as the user device 10 located in a short distance within a certain distance, and a mobile communication module 214 for communicating with the user device 10, another device, or a server through a mobile communication network. The short-range wireless communication module 212 may include at least one communication interface supporting a known short-range wireless communication method such as LTE, LTE-A, and 5G.

In FIG. 2, the device registration and authentication apparatus 21 is illustrated as including the communication unit 210, but according to an embodiment, the communication unit 210 may be implemented in the vehicle 20 without being included in the device registration and authentication apparatus 21. In this case, the device registration and authentication apparatus 21 may use the communication unit 210 through the vehicle ECU 23.

The memory 220 may store information related to a user device registration and authentication operation of the device registration and authentication apparatus 21, data or an algorithm of an authentication APP 242, and the like. In addition, the memory 220 may store information (e.g., device name, cell number, MAC address, phone number, user's email address information, etc.) of the registered user device 10.

The interface 230 may connect the device registration and authentication apparatus 21 to the vehicle ECU 23 to exchange signals or information between the device registration and authentication apparatus 21 and the vehicle ECU 23. The interface 230 may include a wired/wireless connection interface of various known methods. According to an embodiment, the interface 230 may correspond to a component included in the communication unit 210.

The processor 240 may control all operations of components included in the device registration and authentication apparatus 21. According to an embodiment, the processor 240 may generally control the registration and authentication operations of the user device 10 using the authentication APP 242.

Although not shown, according to an embodiment, the device registration and authentication apparatus 21 may further include at least one input device (e.g., a button, dial, touch panel, etc.), at least one output device (e.g., a display, speaker, etc.), and the like.

The vehicle ECU 23 may be connected to a user input apparatus 27 included in the vehicle 20 to receive a user input through the user input apparatus 27. According to an embodiment, the vehicle ECU 23 may transmit the received user input to the device registration and authentication apparatus 21. The user input apparatus 27 is various types of input (or manipulation) devices disposed in the vehicle 20, and may include a start button for receiving an input for starting the engine and turning off the engine, and a dial for selecting a certain menu or item, or receiving an input for increasing/decreasing a volume, changing a channel, or the like. In addition, the user input apparatus 27 may include various types of components, such as a touch panel and/or a touch screen for receiving a touch type input from a user, and a physical button unit for receiving a push type input from a user.

Hereinafter, a registration and authentication process of the user device 10 according to various embodiments will be described in detail with reference to FIGS. 3 to 10.

Figure 3:
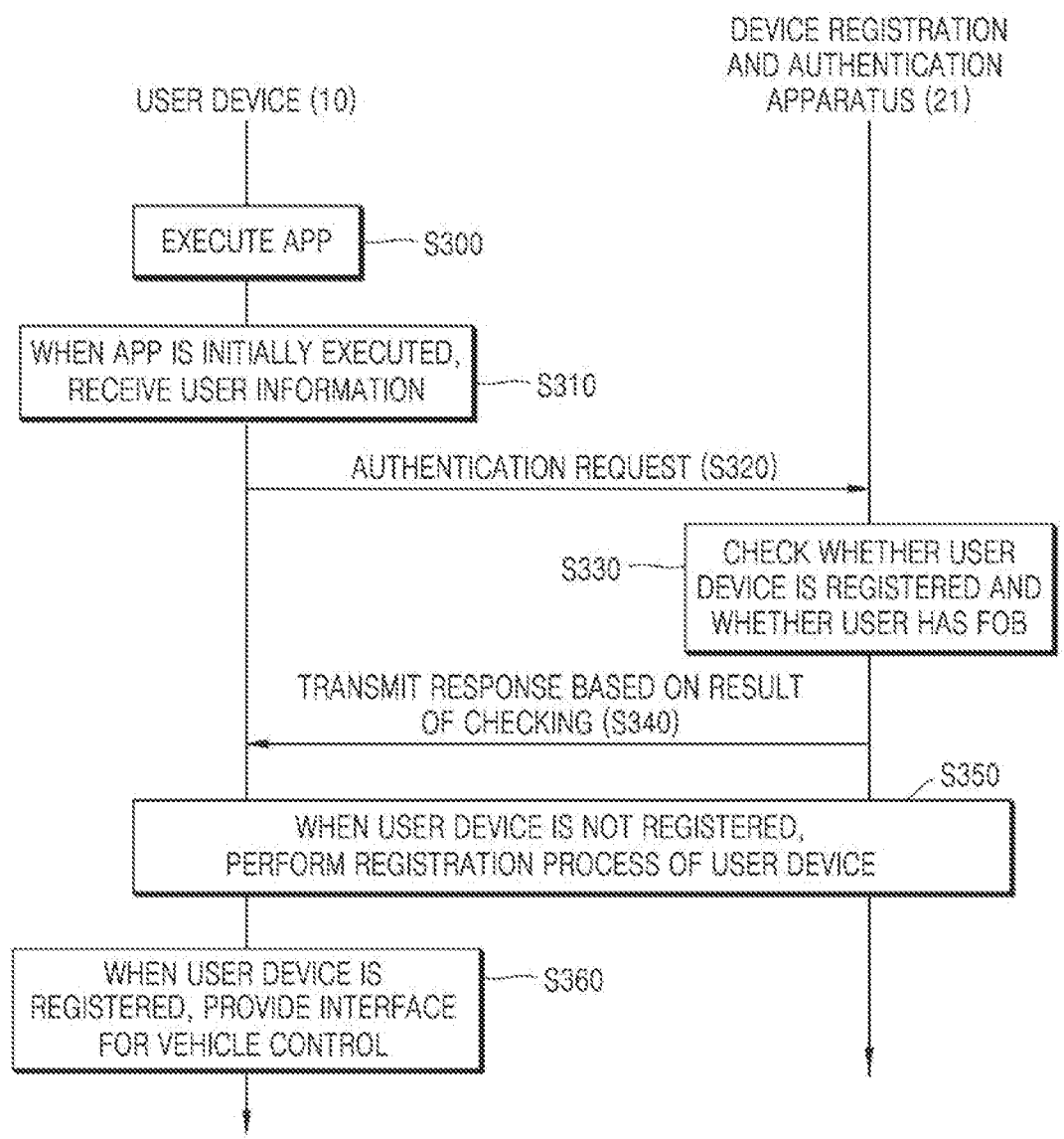
FIG. 3 is a ladder diagram schematically illustrating a registration and/or authentication operation between a device registration and authentication apparatus and a user device.
Figure 4:
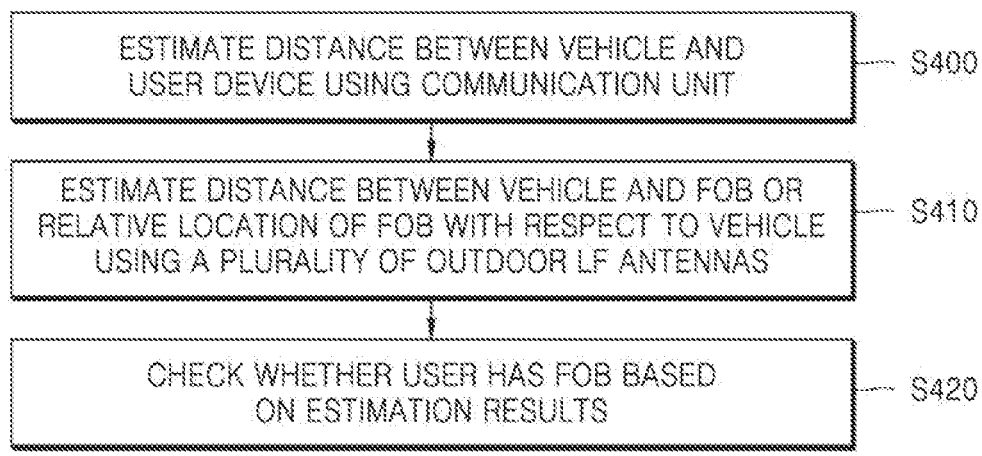
FIG. 4 is a flowchart for explaining an example of an operation in which a device registration and authentication apparatus checks whether a user has a FOB.
Figure 5:
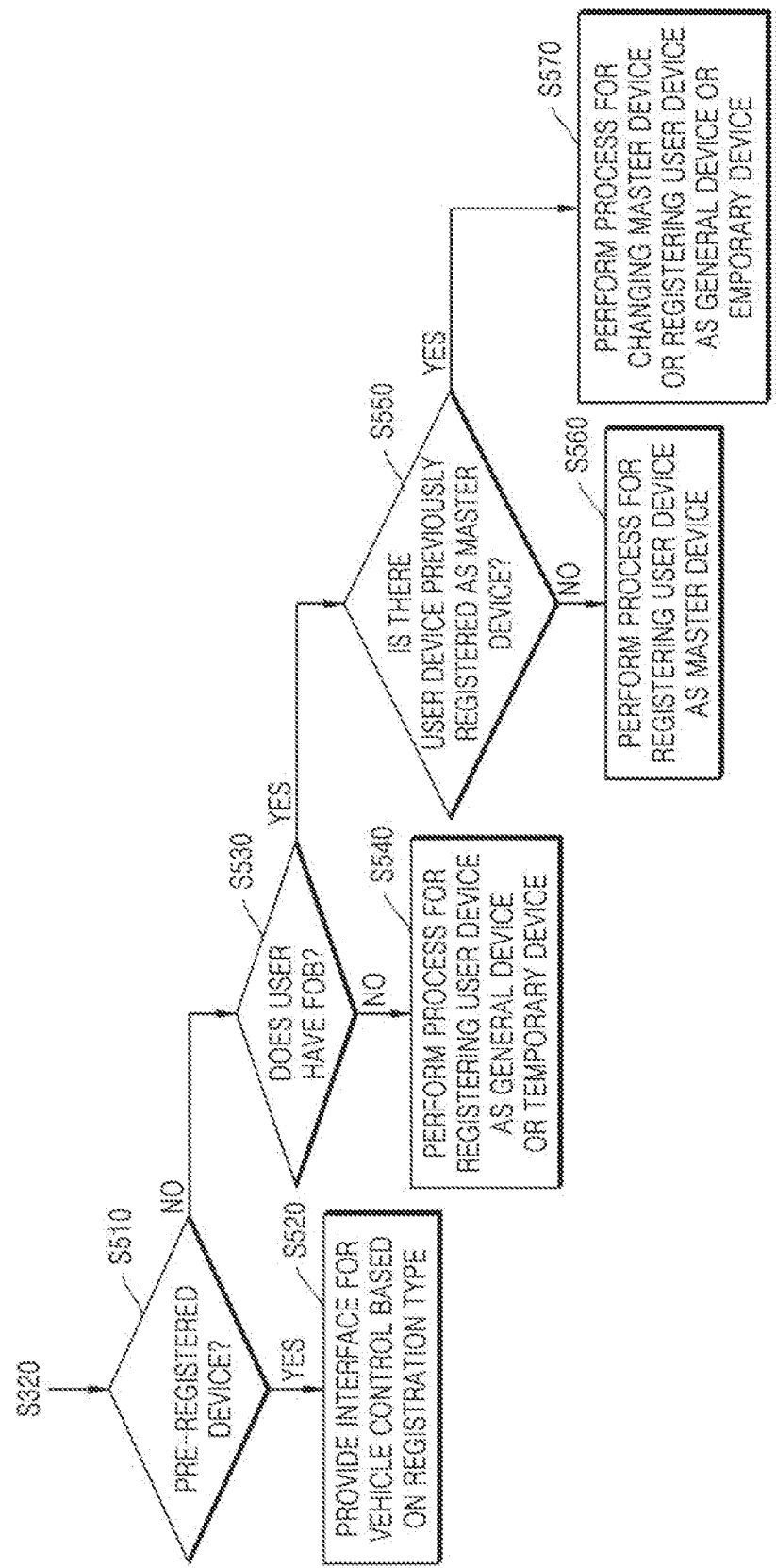
FIG. 5 is a flowchart illustrating an example of a process divided according to whether a user device is registered or not and whether a user has a FOB.

FIG. 3 is a ladder diagram schematically illustrating a registration and/or authentication operation between the device registration and authentication apparatus 21 and the user device 10. FIG. 4 is a flowchart for explaining an example of an operation in which the device registration and authentication apparatus 21 checks whether a user has a FOB. FIG. 5 is a flowchart illustrating an example of a process divided according to whether the user device 10 is registered or not and whether a user has the FOB.

Referring to FIG. 3, in operation S300, the user device 10 may execute the vehicle control APP 152 based on a user's input.

According to an embodiment, in operation S310, when the vehicle control APP 152 is initially executed, the user device 10 may receive user information through the input unit 120 or the like.

When the vehicle control APP 152 is installed and then executed for the first time in the user device 10, it is highly likely that the user device 10 is not registered with the vehicle 20. Accordingly, the processor 150 of the user device 10 may receive user information as part of information required to register the user device 10 with the vehicle 20. For example, the user information may include information such as a user name, age, gender, and phone number. In addition, the user information may further include destination information of random data to be received from the device registration and authentication apparatus 21 later in a device registration process. For example, the destination information may include user's e-mail address information or phone number, but is not limited thereto, and may include information about various devices capable of receiving random data through the mobile communication module 114. According to an embodiment, the user information may be stored in the memory 140 of the user device 10.

According to an embodiment, a function for authenticating whether the destination information is correctly input may be implemented in the vehicle control APP 152. Accordingly, the processor 150 may transmit authentication data (authentication mail, authentication message, random data, etc.) to the destination information, and a user of the user device 10 may perform authentication of the destination information by checking reception of the authentication data or by inputting random data included in the authentication data.

In operation S320, the user device 10 may transmit an authentication request to the device registration and authentication apparatus 21.

When the execution of the vehicle control APP 152 does not correspond to the first execution, the processor 150 may transmit the authentication request to the device registration and authentication apparatus 21 when the vehicle control APP 152 is executed or in response to an authentication input received through the executed vehicle control APP 152. The authentication request may include pre-stored user information and/or device information (device name, cell number, MAC address, phone number, etc.).

When the vehicle control APP 152 is initially executed, the processor 150 may transmit an authentication request including input user information and device information to the device registration and authentication apparatus 21.

In operation S330, the device registration and authentication apparatus 21 may check whether the user device 10 is registered and whether a user has the FOB 12 in response to the received authentication request.

The processor 240 of the device registration and authentication apparatus 21 may check whether the user device 10 to which the authentication request is transmitted is a registered device. For example, the processor 240 may check whether the user device 10 is registered by comparing device information included in the received authentication request with device information (stored in the memory 220, etc.) of a registered user device.

In addition, the processor 240 may check whether the user of the user device 10 has the FOB 12. Hereinafter, an embodiment of a method of checking whether a user has the FOB 12 will be described with reference to FIG. 4.

Referring to FIG. 4, in operation S400, the device registration and authentication apparatus 21 may estimate a distance between the vehicle 20 and the user device 10 using the communication unit 210. As described above in FIG. 2, the communication unit 210 may be a component included in the device registration and authentication apparatus 21, but may be a configuration implemented in a vehicle instead of being included in the device registration and authentication apparatus 21, according to an embodiment. When the communication unit 210 is not included in the device registration and authentication apparatus 21, the device registration and authentication apparatus 21 may use the communication unit 210 through the vehicle ECU 23.

For example, a distance (first distance) between the vehicle 20 and the user device 10 may be estimated using the short-range wireless communication module 212 of the communication unit 210, and a known method of estimating a distance using signal strength or a receiver signal strength indicator (RSSI) may be utilized. According to an embodiment, when a plurality of short-range wireless communication modules 212 are implemented at different locations within the vehicle 20, the device registration and authentication apparatus 21 may estimate a relative location of the user device 10 with respect to the vehicle 20 based on triangulation or the like.

In operation S410, the device registration and authentication apparatus 21 may estimate a distance between the vehicle 20 and the FOB 12 or a relative location of the FOB 12 with respect to the vehicle 20 using a plurality of outdoor LF antennas.

Similar to operation S400, the device registration and authentication apparatus 21 may estimate a distance (second distance) between the FOB 12 and the vehicle 20 using signal strength or an RSSI received from the FOB 12 through an outdoor antenna (e.g., an LF antenna). However, in general, a plurality of outdoor antennas may be provided at different locations in the vehicle 20. Accordingly, the device registration and authentication apparatus 21 may estimate a relative location of the FOB 12 with respect to the vehicle 20 using the plurality of outdoor antennas.

In operation S420, the device registration and authentication apparatus 21 may check whether a user has the FOB 12 based on estimation results of operations S400 to S410.

In more detail, when a difference between the first distance and the second distance is less than a preset threshold, the device registration and authentication apparatus 21 may check that a user has the FOB 12. On the other hand, when the difference between the first distance and the second distance exceeds a threshold, or the second distance is not estimated because the FOB 12 is not detected, the device registration and authentication apparatus 21 may check that a user does not have the FOB 12.

According to an embodiment, the device registration and authentication apparatus 21 may compare the location of the user device 10 with the location of the FOB 12 that are estimated to check whether a user has the FOB 12.

FIG. 3 will be described again.

In operation S340, the device registration and authentication apparatus 21 may transmit, to the user device 10, a response based on a result of checking whether the user device 10 is registered and whether a user has the FOB 12. For example, the response may include information about a process to be performed based on the result of checking.

The device registration and authentication apparatus 21 according to the disclosure may actively set and perform various processes based on the result of checking. In operation S350, when the user device 10 is not registered, the user device 10 and the device registration and authentication apparatus 21 may perform a registration process of the user device 10. On the other hand, in operation S360, when the user device 10 is registered, the processor 150 of the user device 10 may provide an interface for vehicle control. The interface may include a screen provided in a visual form through the display 132 or the like.

Hereinafter, operations S340 to S360 will be described in more detail with reference to FIG. 5.

Referring to FIG. 5, in operation S520, when the user device 10 is a pre-registered device (YES in S510), the device registration and authentication apparatus 21 may transmit a response for providing an interface for vehicle control to the user device 10 based on a registration type.

The control authority of the vehicle 20 may be different depending on the registration type. That is, the device registration and authentication apparatus 21 may register and manage each of a plurality of user devices to have any one registration type.

For example, the registration type may be divided into master, general, and temporary. A user device (master device) registered as master is a device having a kind of administrator authority, and may have more vehicle control authority than other types. The master device (or a user of the master device) may have authority to delete a general device and/or a temporary device that are registered. In addition, as described later in FIGS. 7 to 9, in a registration process of the general and temporary devices, and in a change registration process of the master device, a user device in the process of registration may complete the registration process only after receiving random data from the master device, and thus, the master device may even have the registration authority of other user devices. Only one user device may be registered as a master device in the vehicle 20, but the disclosure is not limited thereto. A user device (general device) registered as a general type may have less control authority (e.g., only control authority related to the operation of a vehicle) of the vehicle 20 than the master device, and may have control authority of the vehicle 20 until deleted by the master device (or a user of the master device). On the other hand, a user device (temporary device) registered as a temporary type may have the control authority related to the operation of a vehicle only during a period approved by the master device (or a user of the master device) or a preset period, and when the period elapses, the control authority may automatically disappear.

On the other hand, when the user device 10 does not correspond to a pre-registered device (NO in S510), the device registration and authentication apparatus 21 may perform a registration process of the user device 10. The registration process may be subdivided according to whether a user has the FOB 12 and whether there is a device previously registered as a master device.

When a user of the user device 10 does not have the FOB 12 (NO in S530), in operation S540, the device registration and authentication apparatus 21 may perform a process for registering the user device 10 as a general device or a temporary device. Operation S540 will be described in more detail later with reference to FIGS. 7 to 8.

When a user of the user device 10 has the FOB 12 (YES in S530) and there is no other user device previously registered as a master device (NO in S550), in operation S560, the device registration and authentication apparatus 21 may perform a process for registering the user device 10 as a master device. Operation S560 will be described in more detail later with reference to FIG. 6.

On the other hand, when there is another user device as a master device (YES in S550), in operation S570, the device registration and authentication apparatus 21 may perform a process for changing the previously registered master device to the user device 10 or registering the user device 10 as a general device or a temporary device. Operation S570 will be described in more detail later with reference to FIG. 9.

Figure 6:
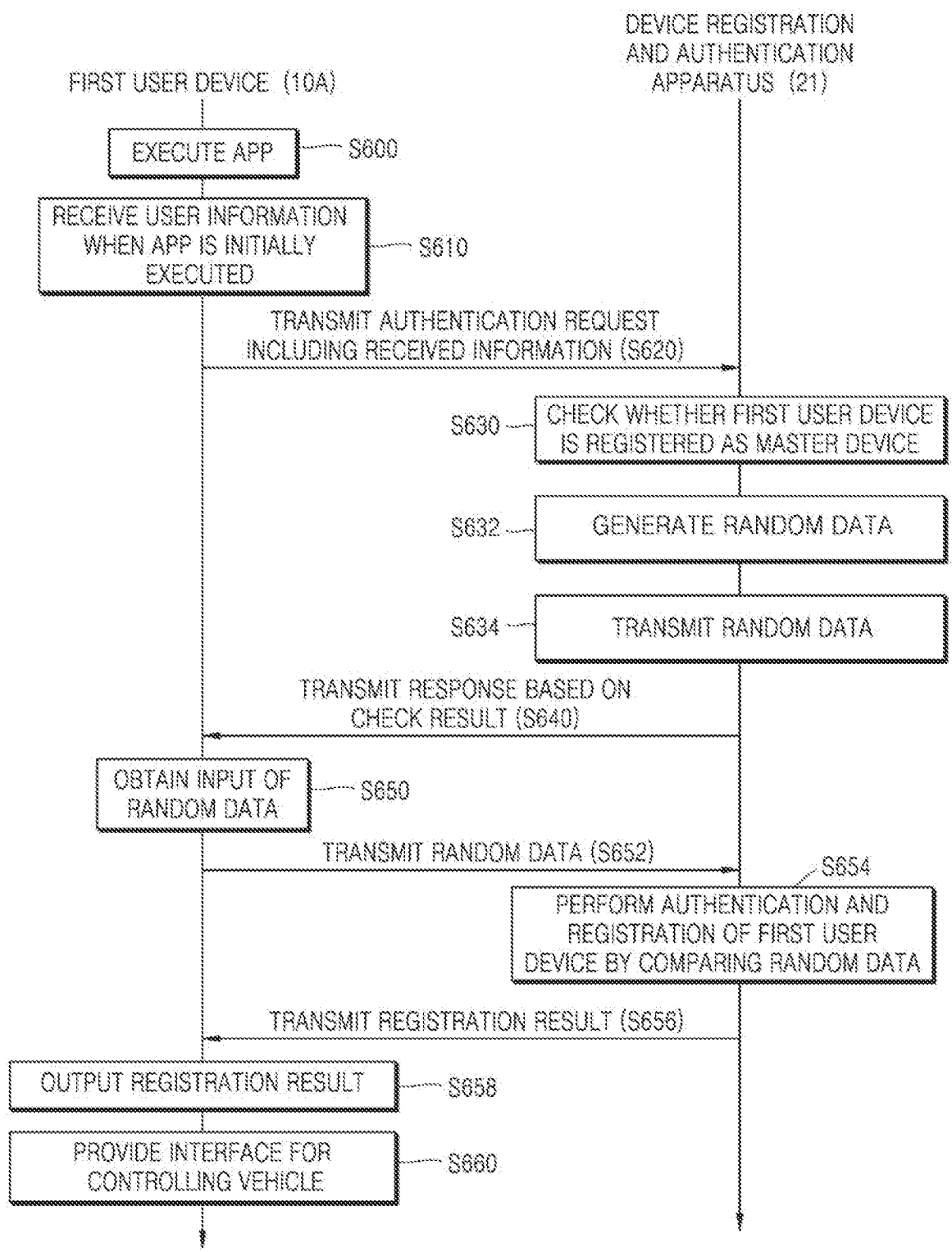
FIG. 6 is a ladder diagram illustrating a process in which a device registration and authentication apparatus registers a first user device as a master device, according to an embodiment.

FIG. 6 is a ladder diagram illustrating a process in which a device registration and authentication apparatus registers a first user device as a master device, according to an embodiment.

Referring to FIG. 6, a first user device 10A executes the vehicle control APP 152 in response to an execution request from a user, etc. in operation S600, receives user information when the vehicle control APP 152 is initially executed in operation S610, and transmits an authentication request including the received user information and device information to the device registration and authentication apparatus 21 in operation S620. Since operations S600 to S620 are similar to operations S300 to S320 of FIG. 3, a redundant description thereof will be omitted.

In operation S630, the device registration and authentication apparatus 21 may check whether the first user device 10A is registered as a master device in response to the received authentication request. According to the embodiments described above in FIGS. 4 to 5, the processor 240 may check that the first user device 10A is not registered, and check that a user has the FOB 12. In this case, the processor 240 may determine to perform a process (hereinafter S632 to S658) of registering the first user device 10A as a master device.

According to the present embodiment, the device registration and authentication apparatus 21 may generate random data as authentication means for authenticating a user of the first user device 10A in operation S632, and may transmit the generated random data to the first user device 10A using destination information included in the received user information in operation S634.

The processor 240 may improve security during authentication by generating random data having different values for each authentication for registration of a user device. The processor 240 may transmit the generated random data to a user using the mobile communication module 214 of the communication unit 210. For example, when the destination information is a user's email address, the processor 240 may transmit an email including the generated random data to the user's email address through the mobile communication module 214. Alternatively, when the destination information is a phone number of the first user device 10A, the processor 240 may transmit an SMS or MMS including the generated random data to the first user device 10A.

According to an embodiment, the random data may be generated differently depending on whether a device registered as a master exists and whether a user of the user device 10 in the process of registration has the FOB 12. As in the embodiment of FIG. 6, when a device registered as a master does not exist, the random data transmitted to the first user device 10A may include one piece of random data corresponding to a master. On the other hand, as described later in FIGS. 7 to 8, when a device registered as a master exists and a user's possession of the FOB 12 is not detected, the random data may include random data corresponding to registration as a general device and random data corresponding to registration as a temporary device. In addition, as described later in FIG. 9, when a device registered as a master exists and a user's possession of the FOB 12 is detected, the random data may include three pieces of random data corresponding to a master device, a general device, and a temporary device, respectively.

According to an embodiment, at least some of the user information may be pre-stored in the memory 220 of the device registration and authentication apparatus 21. In this case, the processor 240 may compare user information received from the first user device 10A with the pre-stored user information, and generate and transmit the random data only when the user information is identical as a result of the comparison. Accordingly, a problem in which an arbitrary user registers his or her user device as a master device may be prevented.

In operation S640, the device registration and authentication apparatus 21 may transmit a response based on the check result to the first user device 10A. For example, the response may include information indicating that a registration process with a master device is in progress.

The first user device 10A may request input of random data transmitted by the device registration and authentication apparatus 21 to obtain input of random data from a user in operation S650, and may transmit the input random data to the device registration and authentication apparatus 21 in operation S652.

For example, the processor 150 may output a screen requesting input of random data through the display 132 based on a received response. A user of the first user device 10A may check random data transmitted as the destination information and input the checked random data through the screen. When the input of random data is obtained, the processor 150 may transmit the obtained random data to the device registration and authentication apparatus 21 through the short-range wireless communication module 112.

In operation S654, the device registration and authentication apparatus 21 may perform authentication and registration of the first user device 10A by comparing the random data received from the first user device 10A with the random data generated in operation S632.

When the received random data and the generated random data match each other, the processor 240 may determine that authentication is successful and register the first user device 10A as a master device of the vehicle 20. When the first user device 10A is registered, the processor 240 may store the user information and the device information received in operation S620 in the memory 220.

In operation S656, the device registration and authentication apparatus 21 may transmit a registration result to the first user device 10A, and in operation S658, the first user device 10A may output the registration result through the output unit 130.

When the registration of the first user device 10A is completed, the processor 240 may transmit a message or notification indicating that the registration is completed to the first user device 10A. The processor 150 of the first user device 10A may output a registration result screen corresponding to the received message or notification through the display 132.

According to an embodiment, when the received random data and the generated random data do not match each other, the processor 240 may transmit a message or notification indicating registration failure to the first user device 10A, or may transmit a message or notification requesting re-input of random data to the first user device 10A. In this case, the processor 150 of the first user device 10A may re-display a random data input screen based on the received message or notification to receive random data again from a user, and transmit the random data to the device registration and authentication apparatus 21.

According to an embodiment, when registration as a master device is completed, in operation S660, the first user device 10A may provide an interface for controlling the vehicle 20 through the vehicle control APP 152.

Figure 7:
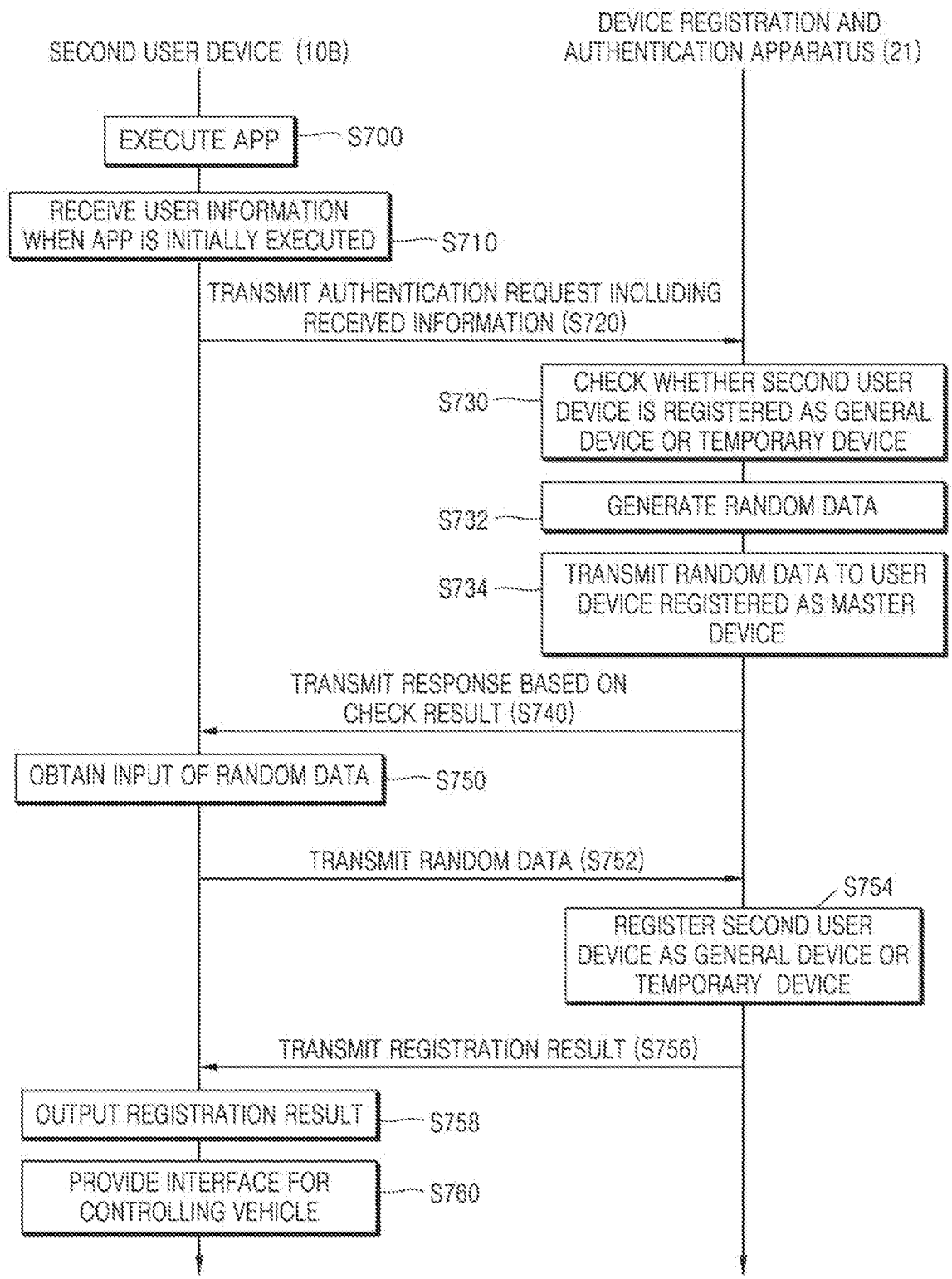
FIG. 7 is a ladder diagram illustrating a process in which a device registration and authentication apparatus registers a second user device as a general device or a temporary device, according to an embodiment.

FIG. 7 is a ladder diagram illustrating a process in which a device registration and authentication apparatus registers a second user device as a general device or a temporary device, according to an embodiment.

Referring to FIG. 7, since operations S700 to S720 are similar to operations S300 to S320 of FIG. 3, a redundant description thereof will be omitted.

In operation S730, the device registration and authentication apparatus 21 may check whether a second user device 10B is registered as a general device or a temporary device in response to a received authentication request. According to the embodiments described above in FIGS. 4 to 5, the processor 240 may check that the second user device 10B is not registered, and check that a user does not have the FOB 12. In addition, the processor 240 may check that another user device is registered as a master device. In this case, the processor 240 may determine to perform a process (hereinafter S732 to S758) of registering the second user device 10B as a general device or a temporary device.

Although not shown, the processor 240 may transmit a request for input of random data destination information of a device (or user) registered as a master to the second user device 10B when determining to perform the process of registering the second user device 10B as a general device or a temporary device. The second user device 10B may transmit destination information input by a user to the device registration and authentication apparatus 21 in response to the input request. The processor 240 may compare the received destination information with random data destination information of the device registered as a master, and when the information is identical as a result of the comparison, the registration process of the second user device 10B may be performed, and when the information does not match each other, the registration process may not be performed.

According to the present embodiment, the device registration and authentication apparatus 21 may generate random data as authentication means for authenticating a user of the second user device 10B in operation S732, and may transmit the generated random data to a user device (or user) registered as a master device in operation S734.

The processor 240 may generate random data and transmit the generated random data to a destination (e-mail, phone number, etc.) of a user device registered as a master device. For example, the random data may include first random data corresponding to a general device and second random data corresponding to a temporary device. According to an embodiment, the random data may further include third random data corresponding to a master device.

In operation S740, the device registration and authentication apparatus 21 may transmit a response based on the check result to the second user device 10B. For example, the response may include information indicating that a process of registering the second user device 10B as a general device or a temporary device is performed, and information indicating that random data for authentication is transmitted to a master device.

The second user device 10B may request input of random data transmitted to the master device to obtain input of random data from a user in operation S750, and may transmit the input random data to the device registration and authentication apparatus 21 in operation S752.

A user of the master device may check the random data received from the device registration and authentication apparatus 21, and provide the checked random data to the user of the second user device 10B. The user of the master device may provide random data corresponding to a desired registration type from among the received first random data to third random data to the user of the second user device 10B.

The user of the second user device 10B may input the provided random data to the second user device 10B through the input unit 120 or the like, and the processor 150 of the second user device 10B may transmit the input random data to the device registration and authentication apparatus 21 through the short-range wireless communication module 112.

In operation S754, the device registration and authentication apparatus 21 may perform user authentication and registration of the second user device 10B by comparing the random data received from the second user device 10B with the random data generated in operation S732.

The processor 240 may compare the received random data with the generated random data. For example, when the received random data matches the generated first random data, the processor 240 may register the second user device 10B as a general device. According to an embodiment, when the received random data matches the generated third random data, the processor 240 may change the second user device 10B into a master device.

When registering the second user device 10B, the processor 240 may store the user information and the device information received in operation S720 in the memory 220, and may store information about a registration type of the second user device 10B.

In operation S756, the device registration and authentication apparatus 21 may transmit a registration result to the second user device 10B, and in operation S758, the second user device 10B may output the registration result through the output unit 130.

When the registration of the second user device 10B is completed, the processor 240 may transmit a message or notification indicating the registration completion and the registration type to the second user device 10B. The processor 150 of the second user device 10B may output a registration result screen corresponding to the received message or notification through the display 132. According to an embodiment, the processor 240 may also transmit a message or notification indicating that the registration of the second user device 10B is completed to the master device.

According to an embodiment, when the received random data does not match any of the generated random data, the processor 240 may transmit a message or notification indicating registration failure to the second user device 10B, or may transmit a message or notification requesting re-input of random data to the second user device 10B. In this case, the processor 150 of the second user device 10B may re-display a random data input screen based on the received message or notification to receive random data again from a user, and transmit the random data to the device registration and authentication apparatus 21.

According to an embodiment, when registration as a general or temporary device is completed, in operation S760, the second user device 10B may provide an interface for controlling the vehicle 20 through the vehicle control APP 152.

Figure 8:
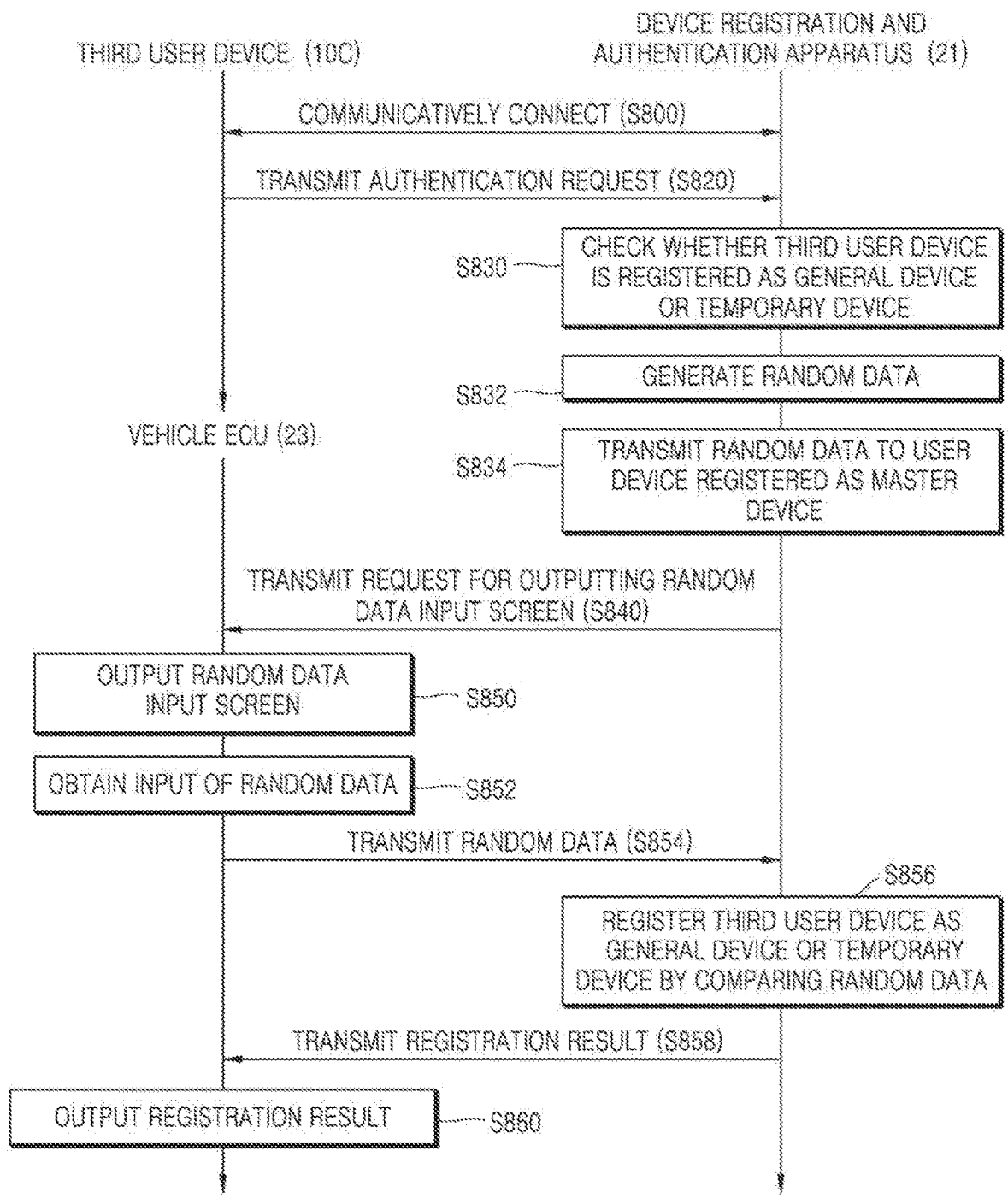
FIG. 8 is a ladder diagram illustrating a process in which a device registration and authentication apparatus registers a third user device as a general device or a temporary device, according to an embodiment.

FIG. 8 is a ladder diagram illustrating a process in which a device registration and authentication apparatus registers a third user device as a general device or a temporary device, according to an embodiment. The embodiment of FIG. 8 may be applied when a third user device 10C is implemented as an RFID tag or an NFC tag, or as a portable device (wearable devices, etc.) without a display and/or input unit, but the disclosure is not limited thereto.

Referring to FIG. 8, in operation S800, when the third user device 10C is communicatively connected to the device registration and authentication apparatus 21 through a short-range wireless communication method or the like, in operation S820, the third user device 10C may transmit an authentication request to the device registration and authentication apparatus 21.

When the processor 150 of the third user device 10C detects that the third user device 10C is connected to the vehicle 20 through the short-range wireless communication module 112 or the like, the processor 150 of the third user device 10C may transmit an authentication request of the third user device 10C to the vehicle 20.

In operation S830, the device registration and authentication apparatus 21 may check whether the third user device 10C is registered as a general device or a temporary device in response to the received authentication request. According to the embodiments described above in FIGS. 4 to 5, the processor 240 may check that the third user device 10C is not registered, and check that a user does not have the FOB 12 (a user's possession of the FOB 12 is not detected). In addition, the processor 240 may check that another user device is registered as a master device. In this case, the processor 240 may determine to perform a process (hereinafter S832 to S860) of registering the third user device 10C as a general device or a temporary device.

Although not shown, when determining a registration process of the third user device 10C as a general device or a temporary device, the processor 240 may output an input screen of random data destination information of a device (or user) registered as a master through a display (AVN, etc.) of the vehicle 20. A user of the third user device 10C may input destination information through the output screen. The processor 240 may compare the received destination information with random data destination information of the device registered as a master, and when the information is identical as a result of the comparison, the registration process of the third user device 10C may be performed, and when the information does not match each other, the registration process may not be performed.

The device registration and authentication apparatus 21 may generate random data as authentication means of the third user device 10C in operation S832, and may transmit the generated random data to a user device (or user) registered as a master device in operation S834.

The processor 240 may generate random data and transmit the generated random data to a destination (e-mail, phone number, etc.) of a user device registered as a master device. For example, the random data may include first random data corresponding to a general device and second random data corresponding to a temporary device.

In operation S840, the device registration and authentication apparatus 21 may transmit a request for outputting a random data input screen to the vehicle ECU 23 based on a result of the check. For example, the processor 240 may recognize that the third user device 10C is a device that does not include a display and/or an input unit, such as a tag, based on device information included in the received authentication request. In this case, the processor 240 may request the output of the random data input screen from the vehicle ECU 23 to receive random data using the display (e.g., AVN, etc.) in the vehicle 20 and the user input apparatus 27.

The vehicle ECU 23 may output a random data input screen requesting input of random data transmitted to the master device in operation S850, may obtain input of random data from a user of the third user device 10C, etc. in operation S852, and may transmit the obtained random data to the device registration and authentication apparatus 21 in operation S854.

The vehicle ECU 23 may output the random data input screen through the display in the vehicle 20 to request input of random data.

In order to input random data, a user of the third user device 10C or a user of a pre-registered device needs to ride in the vehicle 20. For example, when the user of the third user device 10C and the user of the master device accompany, or when the user of the third user device 10C and the user of the master device are the same person, the door of the vehicle is unlocked by the master device and the user may ride in the vehicle 20.

On the other hand, when only the user of the third user device 10C is located near the vehicle 20, the user may not be able to ride the vehicle 20. Accordingly, the device registration and authentication apparatus 21 may transmit random data to the master device in operation S834 and simultaneously or sequentially transmit a request for checking whether the door of the vehicle 20 is unlocked. When the user of the master device inputs a door unlock command in response to the received check request, the master device may unlock the door of the vehicle 20 by transmitting the door unlock command to the vehicle 20.

A user (the user of the third user device 10C, etc.) riding in the vehicle 20 may input random data provided by the user of the master device through the random data input screen and an input device. The user of the master device may provide random data corresponding to a desired registration type from among the received first random data and second random data to the user of the third user device 10C.

In operation S856, the device registration and authentication apparatus 21 may perform user authentication and registration of the third user device 10C by comparing the random data received from the third user device 10C with the random data generated in operation S832.

The processor 240 may compare the received random data with the generated random data. For example, when the received random data matches the generated first random data, the processor 240 may register the third user device 10C as a general device. According to an embodiment, when the received random data matches the generated second random data, the processor 240 may register the second user device 10B as a temporary device.

When registering the third user device 10C, the processor 240 may store the device information (and user information) received in operation S820 in the memory 220, and may store information about a registration type of the third user device 10C.

In operation S858, the device registration and authentication apparatus 21 may transmit a registration result to the vehicle ECU 23, and in operation S860, the vehicle ECU 23 may output the registration result through an output device in the vehicle 20. According to an embodiment, the device registration and authentication apparatus 21 may also transmit the registration result to the third user device 10C, and operations similar to those described in operations S756 and S758 described above with reference to FIG. 7 may be performed.

Figure 9:
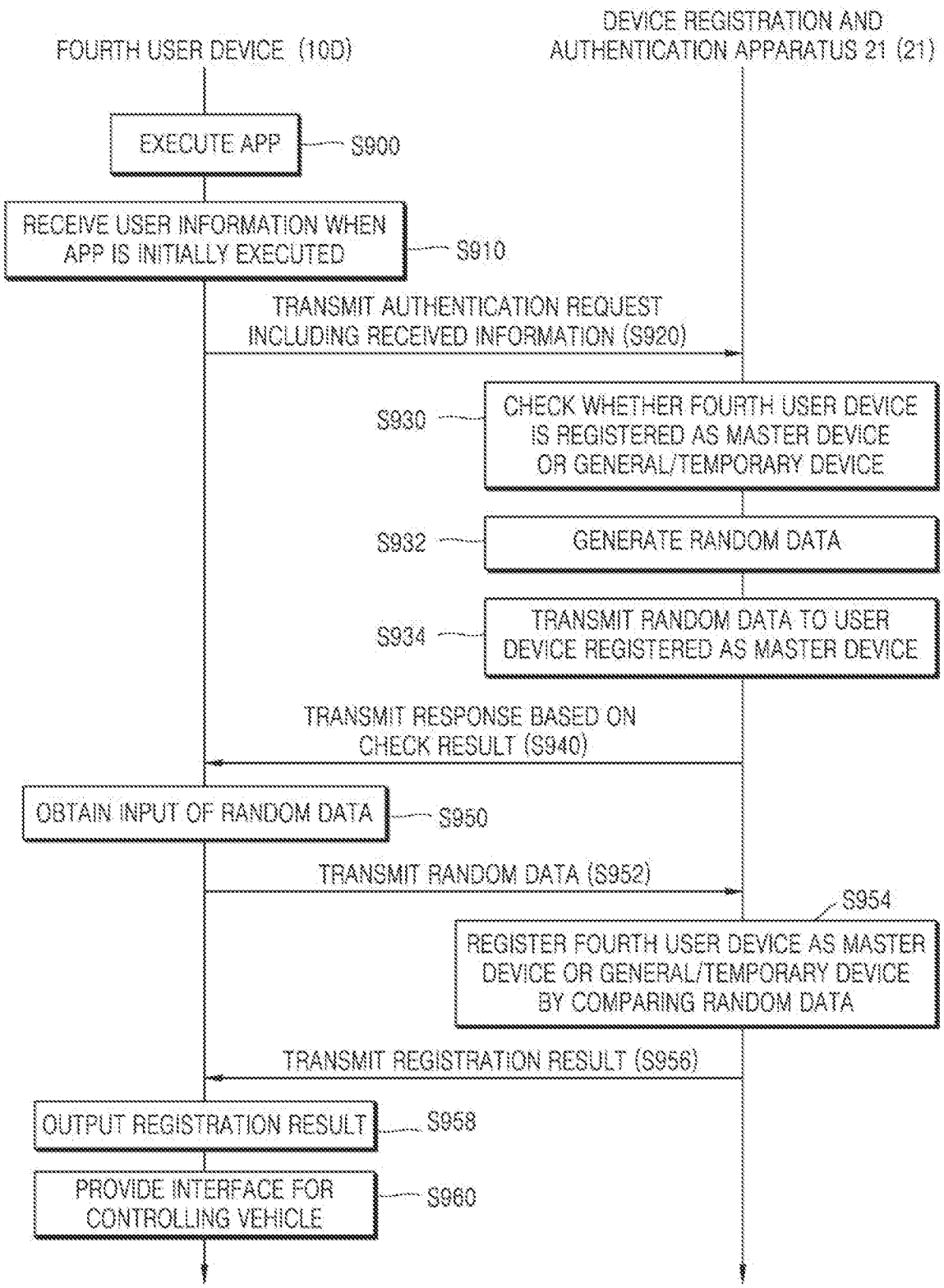
FIG. 9 is a ladder diagram illustrating a process in which a device registration and authentication apparatus registers a fourth user device as a master device, a general device, or a temporary device, according to an embodiment.

FIG. 9 is a ladder diagram illustrating a process in which a device registration and authentication apparatus registers a fourth user device as a master device, a general device, or a temporary device, according to an embodiment.

Referring to FIG. 9, since operations S900 to S920 are similar to operations S300 to S320 of FIG. 3, a redundant description thereof will be omitted.

In operation S930, the device registration and authentication apparatus 21 may check whether a fourth user device 10D is registered as a master device or a general/temporary device in response to the received authentication request. According to the embodiments described above in FIGS. 4 to 5, the processor 240 may check that the fourth user device 10D is not registered, and check that a user has the FOB 12 (a user's possession of the FOB 12 is detected). In addition, the processor 240 may check that another user device is registered as a master device. In this case, the processor 240 may determine to perform a process (hereinafter S932 to S958) of registering the fourth user device 10D as a master device, a general device, or a temporary device.

Although not shown, the processor 240 may transmit a request for input of random data destination information of a device (or user) registered as a master to the fourth user device 10D when determining to register the fourth user device 10D as a master device or a general/temporary device. The fourth user device 10D may transmit destination information input by a user to the device registration and authentication apparatus 21 in response to the input request. The processor 240 may compare the received destination information with random data destination information of the device registered as a master, and when the information is identical as a result of the comparison, the registration process of the fourth user device 10D may be performed, and when the information does not match each other, the registration process may not be performed.

The device registration and authentication apparatus 21 may generate random data as authentication means of the fourth user device 10D in operation S932, and may transmit the generated random data to a user device (or user) registered as a master device in operation S934.

The processor 240 may generate random data and transmit the generated random data to a destination (e-mail, phone number, etc.) of the user device (or the user) registered as a master device. For example, the random data may also include first random data corresponding to a general device, second random data corresponding to a temporary device, and third random data corresponding to a master device.

In operation S940, the device registration and authentication apparatus 21 may transmit a response based on a result of the check to the fourth user device 10D. For example, the response may include information indicating that a process of registering the fourth user device 10D as a master device or a general/temporary device, and information indicating that random data for authentication is transmitted to the master device.

The fourth user device 10D may request input of random data transmitted to the master device to obtain input of random data from a user in operation S950, and may transmit the input random data to the device registration and authentication apparatus 21 in operation S952.

A user of the master device may check the random data received from the device registration and authentication apparatus 21, and provide the checked random data to a user of the fourth user device 10D. The user of the master device may provide random data corresponding to a desired registration type from among the received first random data to third random data to the user of the fourth user device 10D.

The user of the fourth user device 10D may input the provided random data to the fourth user device 10D through the input unit 120 or the like, and the processor 150 of the fourth user device 10D may transmit the input random data to the device registration and authentication apparatus 21 through the short-range wireless communication module 112.

In operation S954, the device registration and authentication apparatus 21 may register the fourth user device 10D by comparing the random data received from the fourth user device 10D with the random data generated in operation S932.

The processor 240 may compare the received random data with the generated random data. For example, when the received random data matches the generated first random data, the processor 240 may register the fourth user device 10D as a general device. According to an embodiment, when the received random data matches the generated third random data, the processor 240 may register the fourth user device 10D as a master device. In this case, a device previously registered as a master may be deleted or the registration type may be changed to a general device.

When registering the fourth user device 10D, the processor 240 may store the user information and the device information received in operation S720 in the memory 220, and may store information about a registration type of the fourth user device 10D.

In operation S956, the device registration and authentication apparatus 21 may transmit a registration result to the fourth user device 10D, and in operation S958, the fourth user device 10D may output the registration result through the output unit 130.

When the registration of the fourth user device 10D is completed, the processor 240 may transmit a message or notification indicating the registration completion and the registration type to the fourth user device 10D. The processor 150 of the fourth user device 10D may output a registration result screen corresponding to the received message or notification through the display 132.

According to an embodiment, when the registration of the fourth user device 10D is completed, in operation S760, the fourth user device 10D may provide an interface for controlling the vehicle 20 through the vehicle control APP 152.

According to the embodiments of FIGS. 6 to 9, the device registration and authentication apparatus 21 and a system including the same may automatically select and perform an appropriate registration process by checking whether a user has the FOB 12 and whether another user device is registered before registering the user device 10. Accordingly, convenience when registering the user device 10 may be improved.

In addition, even if a user of a master device is not located near the vehicle 20, another user may conveniently register a device according to the permission of the user of the master device. In addition, the device registration and authentication apparatus 21 allows multiple users of the vehicle 20 to register devices by classifying registration types according to authority, thereby enabling more convenient management by an administrator of the vehicle 20.

Figure 10:
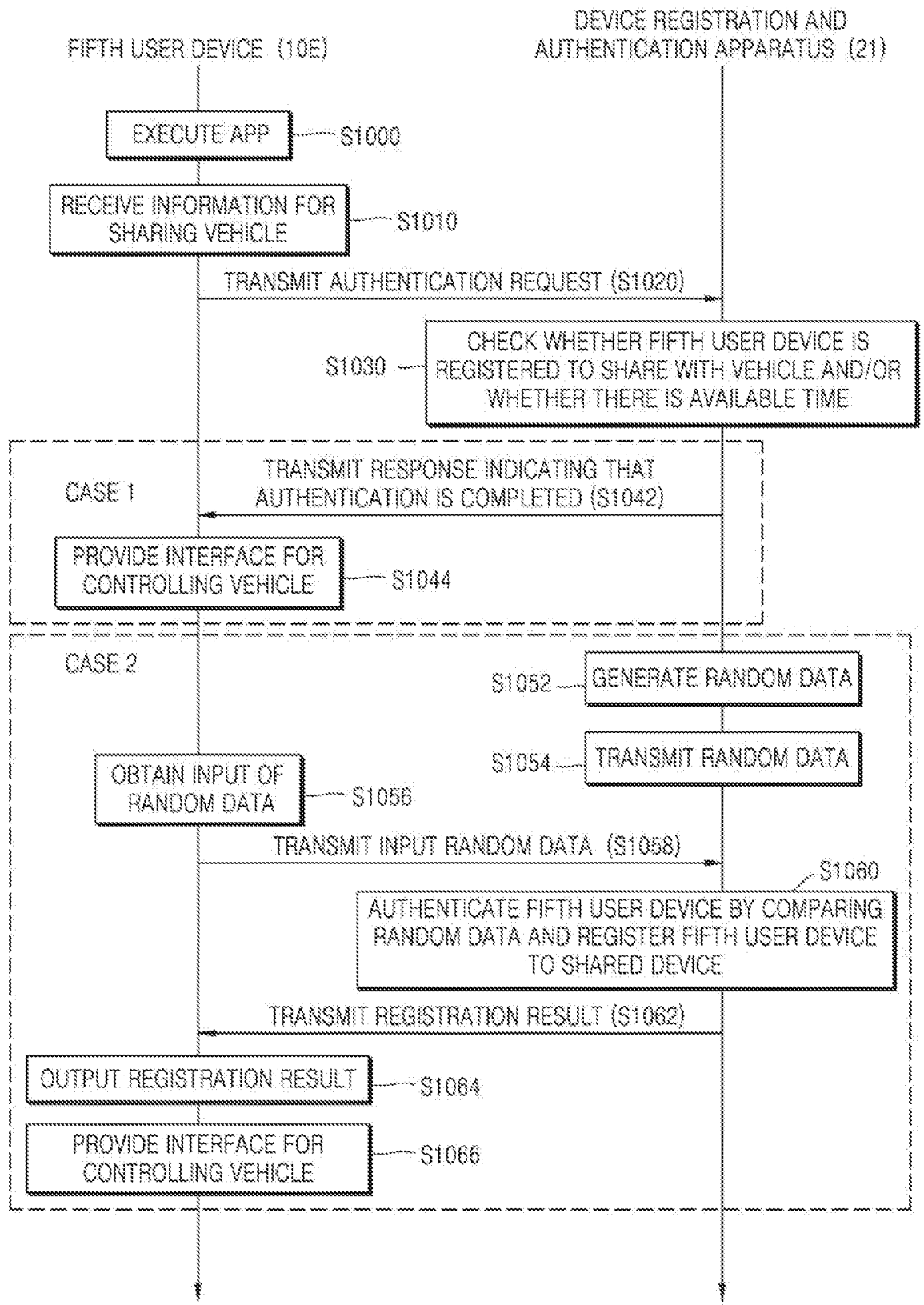
FIG. 10 is a ladder diagram illustrating a process in which a device registration and authentication apparatus mounted on a shared vehicle authenticates and/or registers a fifth user device, according to an embodiment.

FIG. 10 is a ladder diagram illustrating a process in which a device registration and authentication apparatus mounted on a shared vehicle authenticates and/or registers a fifth user device, according to an embodiment.

The embodiment of FIG. 10 relates to authentication and/or registration between the device registration and authentication apparatus 21 provided in the vehicle 20 operated according to a vehicle sharing service, that is, the vehicle 20 shared and used by multiple users, and a user device.

Referring to FIG. 10, in operation S1000, a fifth user device 10E may execute a vehicle control APP (or a vehicle sharing APP) based on a user input or the like. According to an embodiment, in operation S1010, the fifth user device 10E may receive information for sharing the vehicle 20 through the executed APP. For example, the information for sharing the vehicle 20 may include user information (ID, phone number, name, age, driver's license registration number, random data destination, etc.) and/or information about an available time of the vehicle 20 (available time information).

In operation S1020, the fifth user device 10E may transmit an authentication request to the device registration and authentication apparatus 21.

The processor 150 of the fifth user device 10E may transmit an authentication request including information input in operation S1010 and/or information about the fifth user device 10E (device name, cell number, MAC address, etc.) to the device registration and authentication apparatus 21 through the short-range wireless communication module 112 or the like.

In operation S1030, the device registration and authentication apparatus 21 may check whether the fifth user device 10E is registered to share with the vehicle 20 and/or whether there is an available time in response to the received authentication request.

For example, in the case of a vehicle sharing service, an available time may be given by paying a certain cost to use the vehicle 20. According to an embodiment, when the available time is exhausted, the registration of a corresponding user device may be cancelled. Based on this, the device registration and authentication apparatus 21 may check whether the fifth user device 10E is registered for sharing and/or whether there is an available time.

As a result of the check, when an available time for the vehicle 20 of the fifth user device 10E remains (CASE1), in operation S1042, the device registration and authentication apparatus 21 may transmit a response indicating that authentication for the fifth user device 10E (or a user) is completed, and may grant control authority to the vehicle 20. In operation S1044, upon receiving the response, the fifth user device 10E may provide an interface for controlling the vehicle 20.

On the other hand, when the fifth user device 10E is not registered (or when there is no available time) (CASE2), the device registration and authentication apparatus 21 may perform device registration (or available time registration) according to operations S1052 to S1064.

In more detail, the device registration and authentication apparatus 21 may generate random data for authentication in operation S1052, and may transmit the generated random data to the fifth user device 10E according to a destination included in the received user information in operation S1054. The fifth user device 10E requests input of random data transmitted by the device registration and authentication apparatus 21 to obtain input of random data from a user in operation S1056, and may transmit the input random data to the device registration and authentication apparatus 21 in operation S1058.

Since operations S1052 to S1058 are substantially the same as operations S632 to S652 described above with reference to FIG. 6, a redundant description thereof will be omitted.

According to an embodiment, the random data is transmitted from the device registration and authentication apparatus 21 to the fifth user device 10E through short-range wireless communication, etc., and the processor 150 of the fifth user device 10E may display the received random data to a user through the executed APP.

In operation S1060, the device registration and authentication apparatus 21 may authenticate the fifth user device 10E and register the fifth user device 10E as a shared device by comparing the random data received from the fifth user device 10E with the random data generated in operation S1052.

When the received random data and the generated random data match each other, the processor 240 may determine that authentication is successful and register the fifth user device 10E as a shared device for the vehicle 20. In addition, the processor 240 may set an available time for the vehicle 20 according to available time information included in the authentication request received in operation S1020.

In operation S1062, the device registration and authentication apparatus 21 may transmit a registration result to the fifth user device 10E, and the fifth user device 10E may output the registration result through the output unit 130 in operation S1064 and provide an interface for controlling the vehicle 20 in operation S1066.

According to an embodiment, the fifth user device 10E or the device registration and authentication apparatus 21 may transmit information about an available time set for the fifth user device 10E to a server (not shown) of a vehicle sharing service. The server may request payment to a user of the fifth user device 10E based on received information. After the payment is completed, the fifth user device 10E may provide an interface for controlling the vehicle 20.

According to the embodiment of FIG. 10, because the intervention of the server is minimized in a registration process for using the vehicle sharing service between the device registration and authentication apparatus 21 and the user device 10, a communication load is reduced and a more efficient service may be provided.

According to the inventive concept of the disclosure, a device registration and authentication apparatus mounted in a vehicle performs an authentication and registration process of a user device without a separate authentication server, so that a simpler and more efficient system may be implemented.

In addition, the device registration and authentication apparatus detects whether the vehicle has a smart key, such as a FOB, and actively adjusts a registration type of a user device to be registered, thereby enabling easy registration of the user device.

In addition, according to the disclosure, a user of a master device may easily check and manage a registration process without being near the vehicle when registering other user devices, thereby maximizing management convenience.

Effects obtainable by an apparatus and method of registering and authenticating a user device according to the technical idea of the disclosure are not limited to the above-mentioned effects, and other effects not described herein may be clearly understood by one of ordinary skill in the art to which the disclosure belongs from the above description.

While the disclosure has been particularly shown and described with reference to embodiments thereof, it will be understood that various changes in form and details may be made therein without departing from the spirit and scope of the following claims.

Descriptions of features or aspects within each embodiment should typically be considered as available for other similar features or aspects in other embodiments.

What is claimed is:

1. A device registration and authentication apparatus for registering and authenticating a user device for controlling a vehicle, the device registration and authentication apparatus comprising:
a communication unit connected to the user device to receive an authentication request from the user device;
an interface configured to communicatively connect with at least one antenna included in the vehicle and communicating with a FOB of the vehicle; and
a processor configured to detect whether the user device is registered based on at least one of user information and device information included in the received authentication request, to detect whether a user of the user device has the FOB by using the at least one antenna, and to control a registration process of the user device which is set differently depending on whether the user has the FOB when the user device is not registered.

2. The device registration and authentication apparatus of claim 1, wherein the processor registers the user device as a master device, a general device, or a temporary device according to the registration process, and
control authority of the master device is greater than control authority of the general device and the temporary device.

3. The device registration and authentication apparatus of claim 2, wherein the processor controls a registration process for registering the user device as a master device when it is detected that the user has the FOB and there is no other device previously registered as a master device.

4. The device registration and authentication apparatus of claim 3, wherein the processor is configured to:
generate random data for authentication of the user device;
transmit the generated random data according to random data destination information included in the authentication request;
when random data is input through the user device in response to the transmission of the random data, receive the input random data from the user device; and,
when the received random data and the generated random data match each other, register the user device as the master device, and store at least a portion of the user information and the device information included in the authentication request in a memory.

5. The device registration and authentication apparatus of claim 2, wherein the processor controls a registration process for registering the user device as a general device or a temporary device when it is detected that the user does not have the FOB and there is another device registered as a master device.

6. The device registration and authentication apparatus of claim 5, wherein the processor is configured to:
generate random data for authentication of the user device;
transmit the generated random data according to random data destination information of another device registered as the master device;
when random data is input through the user device in response to the transmission of the random data, receive the input random data from the user device; and,
when the received random data and the generated random data match each other, register the user device as the general device or the temporary device, and store at least a portion of the user information and the device information included in the authentication request in a memory.

7. The device registration and authentication apparatus of claim 6, wherein the generated random data comprises first random data corresponding to registration as a general device and second random data corresponding to registration as a temporary device, and
the processor is configured to:
register the user device as a general device when the received random data matches the first random data; and
register the user device as a temporary device when the received random data matches the second random data.

8. The device registration and authentication apparatus of claim 2, wherein the processor controls a registration process for registering the user device as a master device, a general device, or a temporary device when it is detected that the user has the FOB and there is another device registered as a master device.

9. The device registration and authentication apparatus of claim 8, wherein the processor is configured to:
generate random data for authentication of the user device;
transmit the generated random data according to random data destination information of another device registered as the master device;
when random data is input through the user device in response to the transmission of the random data, receive the input random data from the user device; and
register the user device as a master device, a general device, or a temporary device based on the received random data, and store at least a portion of the user information and the device information included in the authentication request in a memory.

10. The device registration and authentication apparatus of claim 9, wherein the generated random data comprises first random data corresponding to registration as a general device, second random data corresponding to registration as a temporary device, and third random data corresponding to registration as a master device, and
the processor is configured to:
register the user device as a general device when the received random data matches the first random data;
register the user device as a temporary device when the received random data matches the second random data; and
register the user device as a master device when the received random data matches the third random data, and cancel registration of another device previously registered as a master device.

11. The device registration and authentication apparatus of claim 1, wherein the processor is configured to:
estimate a distance between the vehicle and the user device using the communication unit or a relative location of the user device with respect to the vehicle;
estimate, by using the at least one antenna, a distance between the vehicle and the FOB or a relative location of the FOB with respect to the vehicle; and
check that the user has the FOB when a difference between the estimated distances or the relative locations is less than a preset threshold.

12. A method of registering and authenticating a user device for controlling a vehicle, the method comprising:
receiving, by a device registration and authentication apparatus included in the vehicle, an authentication request from the user device;
checking, by the device registration and authentication apparatus, whether the user device is registered in response to the received authentication request, and detecting whether a user of the user device has a FOB of the vehicle; and
performing a registration process of the user device which is set differently depending on whether the user has the FOB when the user device is not registered.

13. The method of claim 12, wherein the performing of the registration process comprises:
performing a first registration process for registering the user device as a master device when it is detected that the user has the FOB and there is no other device previously registered as a master device, and
the performing of the first registration process comprises:
generating, by the device registration and authentication apparatus, random data for authentication of the user device, and transmitting the generated random data according to random data destination information included in the authentication request;
receiving, by the user device, an input according to the transmission of the random data, and transmitting the received input to the device registration and authentication apparatus; and
registering, by the device registration and authentication apparatus, the user device as a master device when the received input matches the generated random data.

14. The method of claim 12, wherein the performing of the registration process comprises:
performing a second registration process for registering the user device as a general device or a temporary device when it is detected that the user does not have the FOB and there is another device registered as a master device, and
the performing of the second registration process comprises:
generating, by the device registration and authentication apparatus, random data for authentication of the user device, and transmitting the generated random data according to random data destination information of another device previously registered as the master device, the random data comprising first random data corresponding to registration as a general device and second random data corresponding to registration as a temporary device;
receiving, by the user device, an input according to the transmission of the random data, and transmitting the received input to the device registration and authentication apparatus; and
registering, by the device registration and authentication apparatus, the user device as a general device or a temporary device based on a comparison result between the received input and the generated first random data and second random data.

15. The method of claim 12, wherein the performing of the registration process comprises:
performing a third registration process for registering the user device as a master device, a general device, or a temporary device when it is detected that the user has the FOB and there is another device previously registered as a master device, and
the performing of the third registration process comprises:
generating, by the device registration and authentication apparatus, random data for authentication of the user device, and transmitting the generated random data according to random data destination information of another device previously registered as the master device, the random data comprising first random data corresponding to registration as a general device, second random data corresponding to registration as a temporary device, and third random data corresponding to registration as a master device;

receiving, by the user device, an input according to the transmission of the random data, and transmitting the received input to the device registration and authentication apparatus; and registering, by the device registration and authentication apparatus, the user device as a master device, a general device, or a temporary device based on a comparison result between the received input and the generated first random data, second random data, and third random data.

* * * * *